(12) United States Patent
Cazeneuve et al.

(10) Patent No.: US 8,302,909 B2
(45) Date of Patent: Nov. 6, 2012

(54) SPLICING OF OMEGA-SHAPED STIFFENERS AT A CIRCUMFERENTIAL JOINT IN AN AIRCRAFT FUSELAGE

(75) Inventors: Helene Cazeneuve, Plaisance du Touch (FR); Bruno Cacciaguerra, Les Milles (FR)

(73) Assignee: Airbus Operations SAS, Toulouse (FR)

( * ) Notice: Subject to any disclaimer, the term of this patent is extended or adjusted under 35 U.S.C. 154(b) by 262 days.

(21) Appl. No.: 12/738,594

(22) PCT Filed: Oct. 15, 2008

(86) PCT No.: PCT/FR2008/051862
§ 371 (c)(1),
(2), (4) Date: Jun. 28, 2010

(87) PCT Pub. No.: WO2009/053645
PCT Pub. Date: Apr. 30, 2009

(65) Prior Publication Data
US 2010/0282905 A1    Nov. 11, 2010

(30) Foreign Application Priority Data

Oct. 18, 2007    (FR) ..................... 07 58406

(51) Int. Cl.
*B64C 1/00* (2006.01)
(52) U.S. Cl. .................. 244/120; 244/119; 244/131

(58) Field of Classification Search .............. 244/117 R, 244/119, 120, 131, 123.1
See application file for complete search history.

(56) References Cited

U.S. PATENT DOCUMENTS

| 5,518,208 | A |  | 5/1996 | Roseburg |  |
|---|---|---|---|---|---|
| 2006/0060705 | A1 |  | 3/2006 | Stulc et al. |  |
| 2010/0258676 | A1 | * | 10/2010 | Gauthie et al. | ................ 244/131 |
| 2011/0042519 | A1 | * | 2/2011 | Tacke et al. | .................. 244/131 |

FOREIGN PATENT DOCUMENTS
EP        1719698 A    11/2006

OTHER PUBLICATIONS

International Search Report and Written Opinion dated Apr. 22, 2009.

* cited by examiner

*Primary Examiner* — Timothy D Collins
*Assistant Examiner* — Jamie S Stehle
(74) *Attorney, Agent, or Firm* — Perman & Green, LLP

(57) ABSTRACT

An aircraft fuselage produced by assembling, at a circumferential joint, at least two sections, each section including a coating and at least one element of at least one stiffener, the aforementioned two elements having a closed cross section and being assembled by a splicing piece. The elements of the stiffener and the splicing piece are made of composite. The aforementioned splicing piece, which has two flanges, is fixed to the coatings and to the stiffener elements by working fastenings positioned only on the flanges of the aforementioned splicing piece.

10 Claims, 5 Drawing Sheets

US 8,302,909 B2

SPLICING OF OMEGA-SHAPED STIFFENERS AT A CIRCUMFERENTIAL JOINT IN AN AIRCRAFT FUSELAGE

CROSS-REFERENCE TO RELATED APPLICATIONS

This application is the National Stage of International Application No. PCT/FR2008/051862 International Filing Date, 15 Oct. 2008, which designated the United States of America, and which International Application was published under PCT Article 21 (s) as WO Publication No. WO2009/053645 A2 and which claims priority from, and the benefit of, French Application No. 200758406 filed on 18 Oct. 2007, the disclosures of which are incorporated herein by reference in their entireties.

BACKGROUND

The aspects of the disclosed embodiments relate to the field of assembling sections of an aircraft fuselage. More particularly, the disclosed embodiments relate to the assembly of stiffeners of two sections by splices at a circumferential joint.

An aircraft fuselage is a structure that is usually made up of several panels assembled together. Said panels are reinforced, inside the fuselage, by reinforcing frames and stiffeners. The reinforcing frames are positioned along fuselage sections that are substantially perpendicular to a longitudinal axis of the fuselage. The stiffeners extend over the panels on the longitudinal axis.

When the fuselage is produced by the assembly of at least two sections, the joint between the two sections is called circumferential. At a circumferential joint, the stiffener is interrupted and takes the form of several substantially aligned stiffener elements, with one element per section.

However, the stresses that the stiffener has to sustain must be transmitted from one stiffener element to another despite the presence of the interruptions.

SUMMARY

To assemble two elements of a stiffener between two sections 11a, 11b, as illustrated in FIG. 1a, it is known practice in the prior art to add a splice 3 to ends 27a, 27b of stiffener elements 2a, 2b, said ends being situated at the circumferential joint 5, in order to allow the continuity of the transmission of the stresses in the stiffener. Said splice bears on the elements 2a, 2b facing each section 11a, 11b and is assembled and fastened to the elements 2a, 2b of the stiffener by means of fasteners 7 such as rivets.

In the case of panels made of metal, the metal stiffeners usually have an open cross section which, because of the shape of said cross section, are called I-shaped, J-shaped or T-shaped stiffeners. For stiffeners comprising such cross sections, the splices usually used to assemble the two elements of a stiffener have a L-shaped or J-shaped cross section.

Nowadays, aircraft fuselages are increasingly made, for the fuselage panels, the reinforcing frames, the stiffeners and the splices, of aluminum alloy. Despite the lightness qualities of aluminum, the latter has drawbacks in terms of corrosion resistance and structural fatigue, which is particularly felt in the high-flux circumferential joints.

Moreover, these days, new materials, such as composite materials with a high modulus of elasticity, make it possible to envisage lighter solutions than aluminum for the production of fuselages. The panels and the stiffeners can therefore be made of a composite material such as, for example, a resin-impregnated carbon-fiber-based material.

For such panels, the stiffeners comprising optimal structural characteristics have a closed cross section called omega-shaped. As illustrated in FIG. 1b, a stiffener 2 comprises a head 21, two webs 22, 23 and two flanges 24, 25. The stiffener is fastened to a face of a fuselage panel by the two flanges 24, 25.

In the case of stiffeners made of metal, of the I, J, T type, the J-shaped or L-shaped splice is fastened to each of the two elements of a stiffener by fasteners placed on the flanges and the web. In the case of stiffeners comprising a closed cross section, such as the omega-shaped stiffeners, the fasteners placed on the webs in order to assemble each stiffener element to the splice are very difficult to inspect because of the practical impossibility of gaining access to the inside of the closed cross section of the stiffener.

The aspects of the disclosed embodiments propose, at a circumferential joint of an aircraft fuselage, a splicing between two elements of a stiffener comprising a closed cross section which avoids the necessity of placing fasteners in the web and the head of said stiffener while ensuring the continuity of transmission of the longitudinal stresses.

According to the disclosed embodiments, an aircraft fuselage comprises a circumferential joint of at least two sections, each section comprising:
 a skin,
 at least one element of at least one stiffener,
 each element of a stiffener:
 being positioned substantially facing the other element at the joint,
 comprising two webs,
 comprising two flanges,
 said two webs and two flanges determining, with the skin, a closed cross section,
 in which fuselage the two opposing elements forming a stiffener are assembled by means of a splice, wherein the stiffener and the splice are made of composite material, and in that the splice
 comprises two webs,
 comprises two flanges, said flanges each comprising a bearing surface in contact with the flanges of the elements,
 is fastened to the skins and to the elements by means of working fasteners positioned only on the flanges of the splice.

In one embodiment, each stiffener element comprises a head between the two webs determining a stiffener cross section called omega-shaped.

In order to take account of the fact that all the tension-compression stresses run between the stiffener elements through the flanges of said elements, each flange of each stiffener element has an end zone comprising an increased cross section and further comprising a length greater than a distance $D_a$, $D_b$ of overlap of the splice.

Preferably, for all of the tension-compression stresses in the stiffener to be transmitted from the flanges of the elements to the flanges of the splice, each length $D_a$, $D_b$ of overlap is determined in order to allow working fasteners to be placed over said length of overlap. Moreover, the bearing surfaces of the flanges of the splice are in contact with the flanges of the stiffener elements over substantially all of said bearing surfaces over the lengths of overlap $D_a$, $D_b$.

In one exemplary embodiment, the bearing surfaces are substantially flat.

In another exemplary embodiment, said bearing surfaces are formed to be in contact with the stiffener elements and the skins while taking account of the geometry of said elements and of said skins.

In one embodiment, the splice comprises a head, two webs and two flanges defining an omega-shaped cross section, the internal dimensions of said cross section being determined in order to make it possible to fasten the superposed splice to the stiffener elements while ensuring that the flanges of the splice are in contact with the flanges of the stiffener elements.

Preferably, in order to perform a function of drainage and inspection of the fasteners placed on the ferrule, the head of the splice comprises at least one recess.

In another embodiment, the splice comprises two lateral portions, each comprising a web and a flange, said two lateral portions being positioned on each side of the webs of the stiffener elements and connected by a central portion positioned longitudinally on the splice between the ends of said stiffener elements and capable of holding in relative position, one relative to the other, the two lateral portions when the splice is put in place.

In one embodiment, in order to participate in the structural portion of the assembly, the central portion comprises a bearing surface, in line with the bearing surfaces of the flanges of the lateral portions, fastened to the skins by means of working fasteners.

In another embodiment, in order to prevent the webs being warped from the lateral portions, the central portion comprises at least one reinforcing rib, said rib being substantially in a cross-sectional plane of the splice and being fastened to the webs of the lateral portions.

In another variant embodiment, in order to improve the stability of the lateral portions, said lateral portions comprise a flanged edge at the end of the webs opposite to the flanges of the splice.

In another embodiment, the splice comprises two independent lateral portions, a first portion arranged on one side of the webs of the stiffener elements, a second portion on the other side of the webs.

BRIEF DESCRIPTION OF THE DRAWINGS

The detailed description of the disclosed embodiments is made with reference to the figures which represent.

DETAILED DESCRIPTION

Figure 1A:
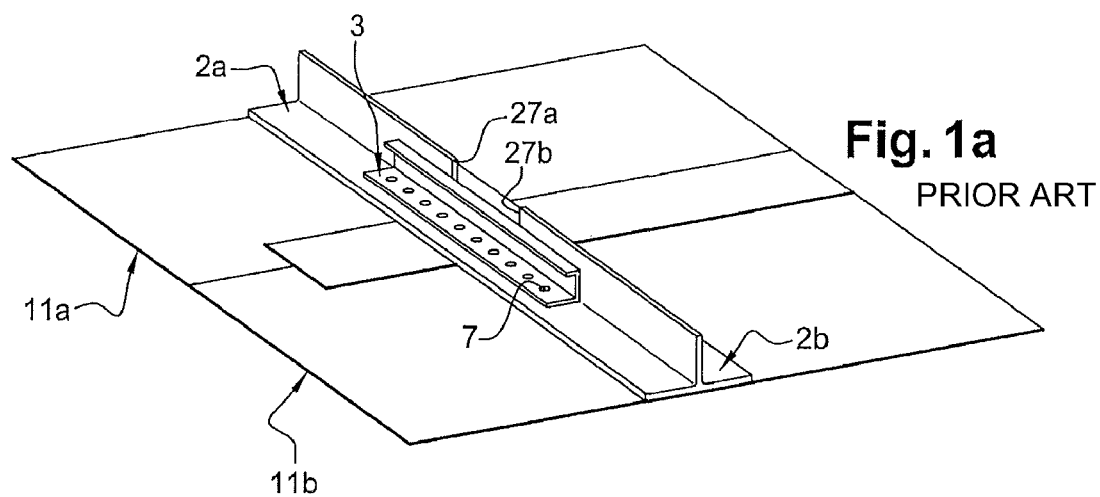
FIG. 1a, already cited, a view of a stiffener assembled by means of a splice according to the prior art, FIG. 1b, already cited, a view in perspective of a stiffener comprising an omega-shaped cross section, FIG. 2, a schematic view of a portion of an aircraft fuselage, FIG. 3a, a schematic view in perspective of an omega-shaped stiffener assembled by means of a splice according to a first embodiment of the disclosed embodiments, FIG. 3b, a view in perspective of the splice assembling two elements of an omega-shaped stiffener according to the first embodiment of the disclosed embodiments, FIG. 4a, a schematic view in perspective of an omega-shaped stiffener assembled by means of a splice according to a second embodiment of the disclosed embodiments, FIGS. 4b, c, d, e various views of the splice according to the second embodiment illustrating variant embodiments of the splice, FIG. 5, a schematic view in perspective of an omega-shaped stiffener assembled by means of a splice according to a third embodiment of the disclosed embodiments.
Figure 1B:
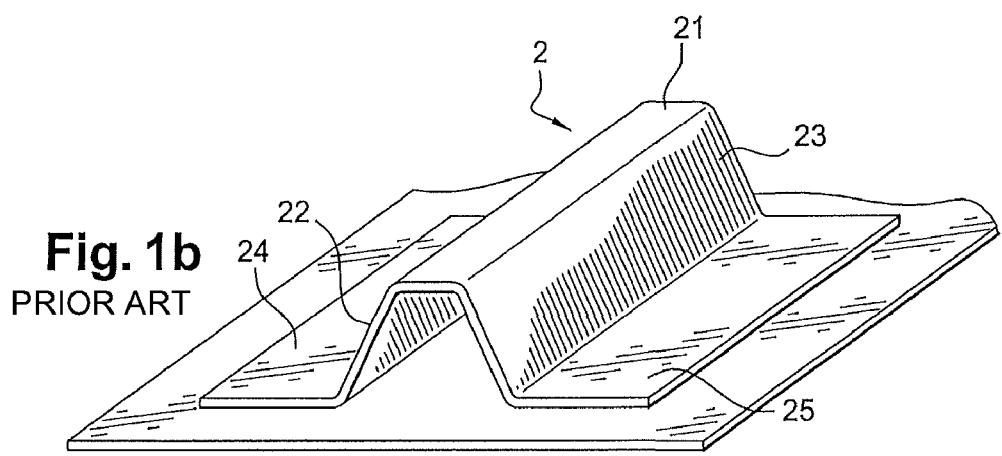
Figure 2:
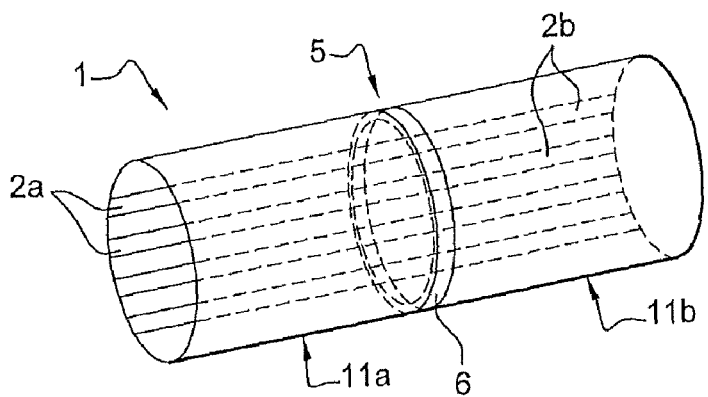

An aircraft fuselage 1, as illustrated in FIG. 2, is made by assembling at least two substantially cylindrical sections 11a, 11b at circumferential joints 5. Each section 11a, 11b comprises a skin 12a, 12b made with at least one fuselage panel. At a joint 5, the panels are assembled together by a ferrule 4.

In order to ensure that the fuselage 1 has the necessary rigidity, said fuselage comprises reinforcing frames 6 and stiffeners. The reinforcing frames 6, the ferrule 4 and the panels are assembled at the circumferential joint.

At a circumferential joint 5, the stiffeners are interrupted and appear in the form of two elements 2a, 2b per stiffener, situated facing one another when the two sections are assembled and extend, on a longitudinal axis of the fuselage, over each section 11a, 11b. The elements 2a, 2b of a stiffener are fastened to a skin 12a, 12b of a section 11a, 11b of the fuselage.

In order to transmit the stresses from one stiffener element to another despite the presence of the interruption and thus ensure the structural continuity of the stiffener, the two elements 2a, 2b are assembled by means of a splice 3. Said splice rests on the ends 27a, 27b of said two elements, and is fastened to the elements 2a, 2b of the stiffener by means of fasteners 7, such as rivets.

A notch 37 is made in the frame 6 in order to ensure the passage of the splice 3 and allow the stresses to be transmitted from one stiffener element to another by means of said splice.

In the exemplary embodiments illustrated by FIGS. 3a to 5, the assembly of a stiffener, at a circumferential joint 5 between two sections 11a, 11b of an aircraft fuselage is described in the case of a closed-section stiffener comprising an omega-shaped cross section.

Figure 3A:
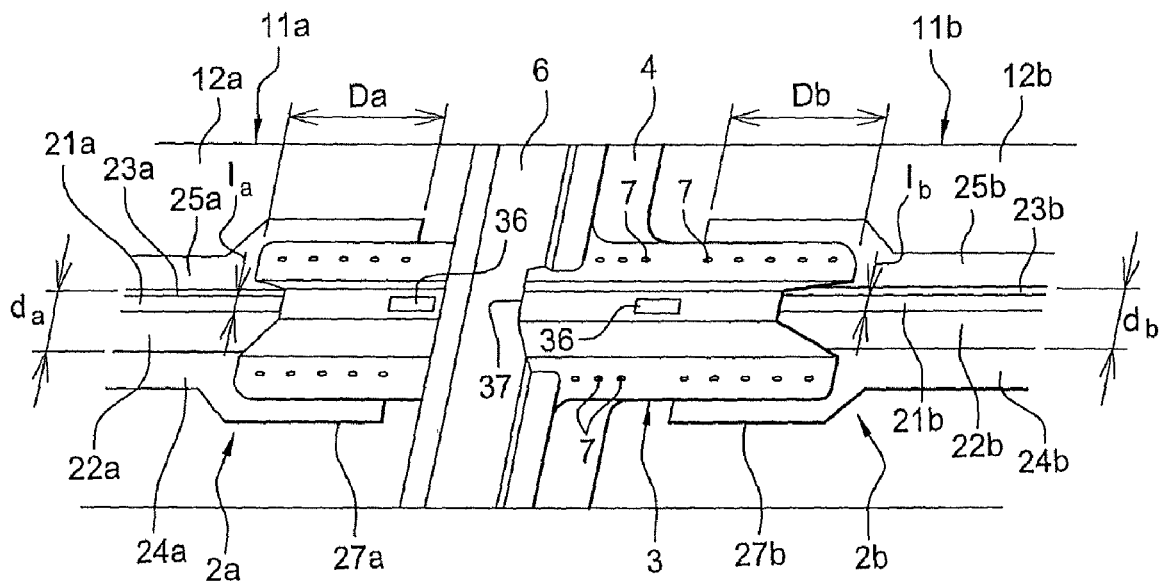
Figure 3B:
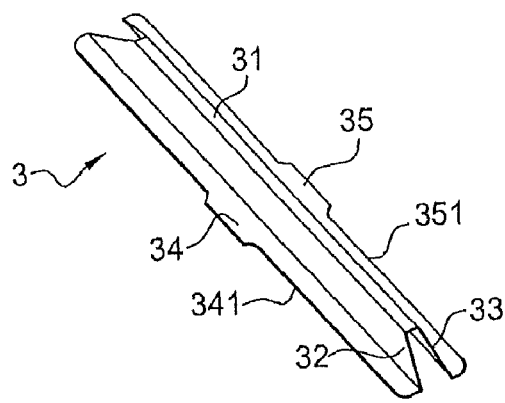

The element 2a of a stiffener, as illustrated in FIG. 3a, comprises a head 21a, two webs 22a, 23a and two flanges 24a, 25a. The two flanges are substantially coplanar. Each flange 24a, 25a is connected to a web 22a, 23a that is inclined relative to the plane of the flanges. Said webs hold the head 21a at a substantially constant distance from the flanges. The element 2a of the stiffener is fastened to the skin 12a of the section 11a by the two flanges 24a, 25a. Therefore, the stiffener 2a, assembled on the skin 12a, advantageously forms a rigid and strong box structure.

In a similar manner, the element 2b of the stiffener comprises a head 21b, two webs 22b, 23b, and is assembled on the skin 12b of the section 11b in the same manner.

For the purposes of describing the exemplary embodiments, the head 21a, respectively 21b, has a width $I_a$, respectively $I_b$. The two flanges 24a, 25a, respectively 24b, 25b, are separated by a distance $d_a$, respectively $d_b$. Usually with the omega-shaped stiffeners, as shown in FIGS. 3a to 5, the distance $d_a$, respectively $d_b$, is greater than the width $I_a$, respectively $I_b$. The principles of the disclosed embodiments are however applicable in the case of stiffeners that do not satisfy this requirement of $d_a$ being greater than or equal to $I_a$, respectively $d_b$ being greater than or equal to $I_b$.

According to the disclosed embodiments and contrary to the prior art, the splice transmitting the stresses between the stiffener elements is entirely fastened only by the flanges so that no fastener is fastened to the webs or the head, that is to say in a location where the fastening is in a blind zone making an inspection practically impossible, for example in the case of a joint comprising a large number of fasteners.

In order to achieve this result while guaranteeing the structural quality of the joint, it is necessary to adapt the splice and the stiffener elements together, at least in the zones where the splice is fastened.

According to a first embodiment, shown by FIG. 3a, the splice 3, which ensures structural continuity between the two elements 2a, 2b, situated substantially facing one another, of a stiffener, has a substantially omega-shaped cross section, as for the stiffener elements 2a, 2b. Said splice comprises a head 31, two webs 32, 33 and two flanges 34, 35, said flanges comprising a bearing surface 341, 351. Said splice overlaps the ends 27a, 27b of the two elements 2a, 2b situated on each side of the joint so that the head 31 of the splice 3 overlaps the heads 21a, 21b of the ends 27a, 27b of the two stiffener elements 2a, 2b, and so that the web 32, respectively 33, overlaps the webs 22a, 23a, respectively 22b, 23b, of the ends 27a, 27b of the stiffener elements 2a, 2b.

The bearing surface 341, respectively 351, of the splice 3 is in contact with the flanges 24a, 24b, respectively 25a, 25b, of the ends 27a, 27b of the two stiffener elements 2a, 2b and on the skin 12a, respectively 12b, or the ferrule 4, when said ferrule is placed on the skins 12a, 12b situated on the same side as the stiffener elements 2a, 2b. The bearing surfaces 341, respectively 351, are fastened to the flanges 24a, 24b, respectively 25a, 25b, and the ferrule 4 or the skin 12a, 12b by means of fasteners 7, such as for example rivets.

Preferably, the bearing surfaces 341, 351 of the splice 3 are formed to ensure contact in all the zones where the working fasteners must be placed while taking account of the geometry of the flanges 24a, 24b, 25a, 25b of the stiffener elements 2a, 2b and of the ferrule 4 or the skin 12a, 12b.

In another exemplary embodiment, when the bearing surfaces 341, 351 of the splice 3 are substantially flat, shims are positioned so that the splice 3 is in perfect contact on said stiffener elements 2a, 2b and the ferrule 4 or the skin 12a, 12b.

The splice 3 extends over a length of overlap $D_a$, respectively $D_b$, of each stiffener element 2a, respectively 2b, so that the number of fasteners 7 placed on said length of overlap is sufficient for all of the tension-compression stresses to be transmitted from the flanges 24a, 24b, respectively 25a, 25b, of the elements 2a, 2b to the flanges 34, 35 of the splice 3. Because the splice 3 is fastened only to the flanges 24a, 24b, 25a, 25b of the stiffener elements 2a, 2b, the length of overlap $D_a$, $D_b$ is greater, relative to an embodiment of a conventional splice between two sections, than the length of overlap of a splice fastened also to the web of the stiffener elements.

To ensure that the stresses are transmitted, the bearing surfaces 341, 351 of the flanges 34, 35 of the splice 3 must necessarily be in contact with the flanges 24a, 24b, 25a, 25b of the stiffener elements 2a, 2b. For this, the internal dimensions of the cross section of the splice (3) are such that said internal dimensions are always greater than or equal to the external dimensions of a theoretical stiffener. The theoretical stiffener is characterized by an envelope of all the stiffeners, in relative position, taking account of the dimensional uncertainties and positional tolerance uncertainties, inevitable because of the manufacturing tolerances, between the two stiffener elements.

At the joint between the stiffener elements 2a, 2b and the splice 3, all of the stresses are transmitted from one stiffener element to another via the flanges 24a, 24b, 25a, 25b of said elements. To take account of the increase of the stresses in said flanges, the cross section of the flanges of the stiffener elements 2a, 2b is increased, over an end zone of a length greater than the length of overlap $D_g$, $D_b$ so that the stresses remain within the structural limit of the material. Advantageously, in order therefore to ensure a progressive transmission of the stresses and to prevent an overthickness of the flange 24a, 24b, 25a, 25b, at the end of the stiffener element and in the zone of fastening with the splice, each flange is widened. This widening of the flanges also makes it possible to take account of the misalignment tolerances between the two stiffener elements when the sections are assembled.

The flanges 34, 35 of the splice 3 are also given thickness and width dimensions in order, to transmit the stresses. Preferably, the width of the baseplaces 34, 35 is chosen so that, because of the tolerances of dimensioning and positioning of the stiffener elements 2a, 2b, the flanges 34, respectively 35, of the splice are, over the whole of their length, always fully resting on the flanges 24a, 24b, respectively 25a, 25b, of said elements.

In order to perform a function of drainage and to allow inspection of the fasteners, in order for the two sections to be assembled together at the circumferential joint situated on the ferrule 4, beneath the head 31 of the omega-shaped splice 3, at least one recess 36 is made in the head 31 of said splice.

Figure 4A:
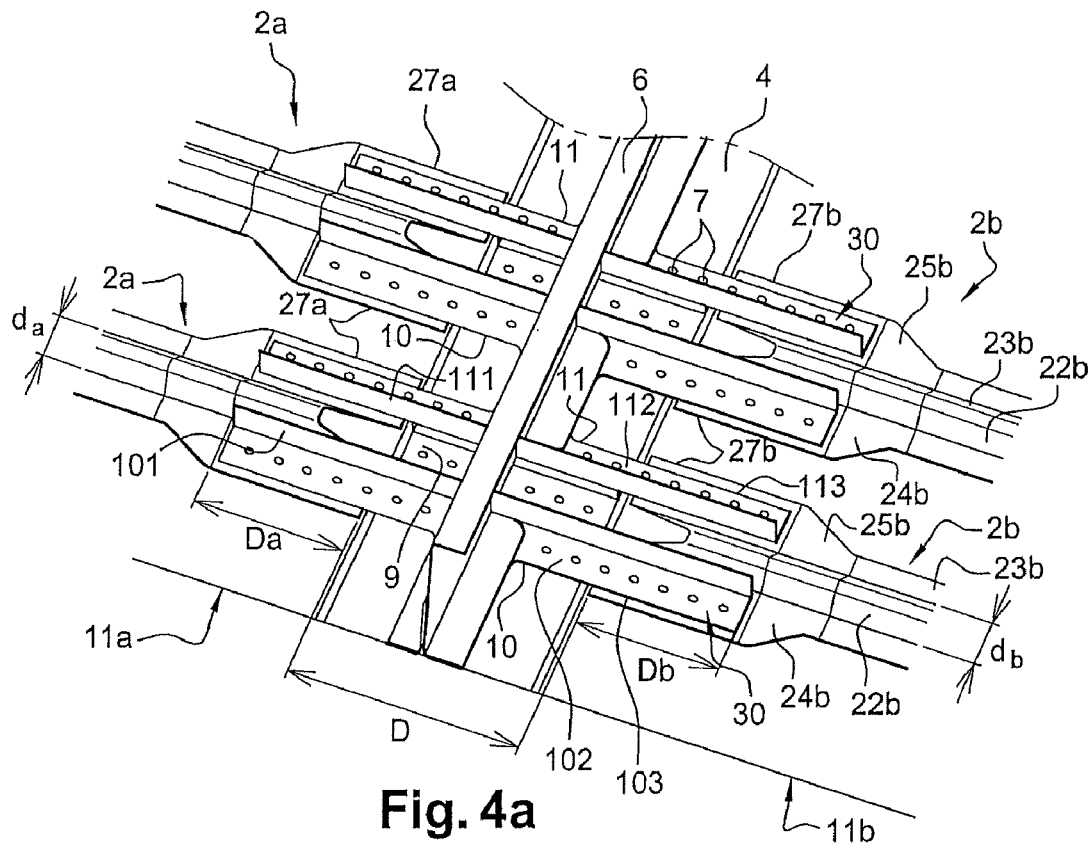

In a second embodiment, illustrated by FIG. 4a, the splice 30 used for assembling the two omega-shaped stiffener elements 2a, 2b comprises two lateral portions 10, 11 each comprising a substantially L-shaped cross section and a central portion 9 connecting the two lateral portions 10, 11 and holding together, in a predetermined position, the two lateral portions so that said two lateral portions rest only on the flanges of the stiffener elements 2a, 2b.

The central portion 9 is wider than the distance $d_a$ or $d_b$ between the two flanges 24a, 25a or 24b, 25b of a stiffener element 2a or 2b in order to take account, as described in the case of the first embodiment, of the misalignment tolerances between the two stiffener elements 2a, 2b when the two sections 11a, 11b are assembled.

Each lateral portion 10, 11 comprises a web 101, 111 and a flange 102, 112 comprising a bearing surface 103, 113. The two lateral portions are positioned on either side of the omega-shaped stiffener elements 2a, 2b with their webs 101, 111 positioned on the side of the webs 22a, 22b, 23a, 23b of the omega-shaped stiffener elements 2a, 2b. The flanges 102, 112 of the splice 30 are fastened to the flanges 24a, 24b, 25a, 25b of the two stiffener elements 2a, 2b and the ferrule 4 or the skin 12a, 12b.

In a manner similar to the first embodiment, the bearing surface 103, respectively 113, of the lateral portion 10, respectively 11, rests on the flanges 24a, 24b, respectively 25a, 25b of the ends 27a, 27b of the two stiffener elements 2a, 2b and on the ferrule 4 or the skin 12a, respectively 12b. The bearing surfaces 103, 113 are fastened respectively to the flanges 24a, 24b and 25a, 25b and the ferrule 4 by means of fasteners 7.

The lateral portions extend, on either side of the ends of the two stiffener elements, over the length of overlap $D_a$, $D_b$ that is sufficient to allow the working fasteners 7 to be installed and thus to ensure the transmission of the tension-compression stresses from the flanges 24a, 24b, 25a, 25b of the elements 2a, 2b to the flanges 102, 112 of the splice 30.

The central portion 9 comprises at least one working structural zone. Said central portion is positioned between the two ends 27a, 27b of the two stiffener elements 2a, 2b when the splice is put in place.

In one embodiment, said structural portion of the central portion 9 comprises a bearing surface 93, substantially in line with the bearing surfaces of the flanges, formed to rest on the skins 12a, 12b, or the ferrule 4 between the ends 27a, 27b of the stiffener elements. Said central portion is therefore shorter than a distance D separating the two ends 27a, 27b of the two stiffener elements 2a, 2b.

Advantageously, the central portion 9 is fastened, by means of fasteners 7, such as rivets, to the ferrule 4 or the skin 12a, 12b and participates in the structural quality of the assembly.

Figure 4B:
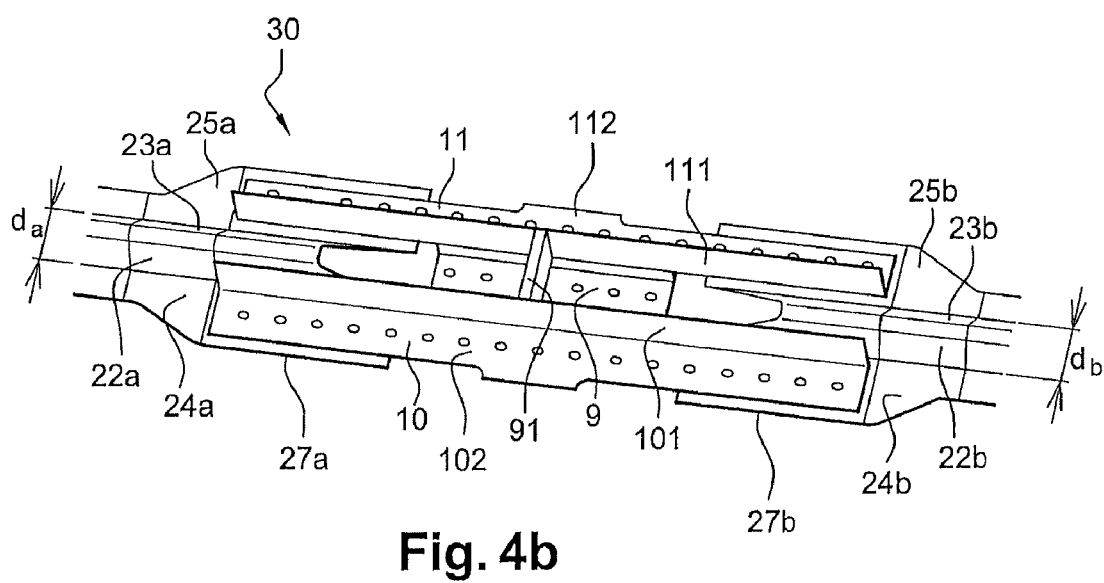
Figure 4C:
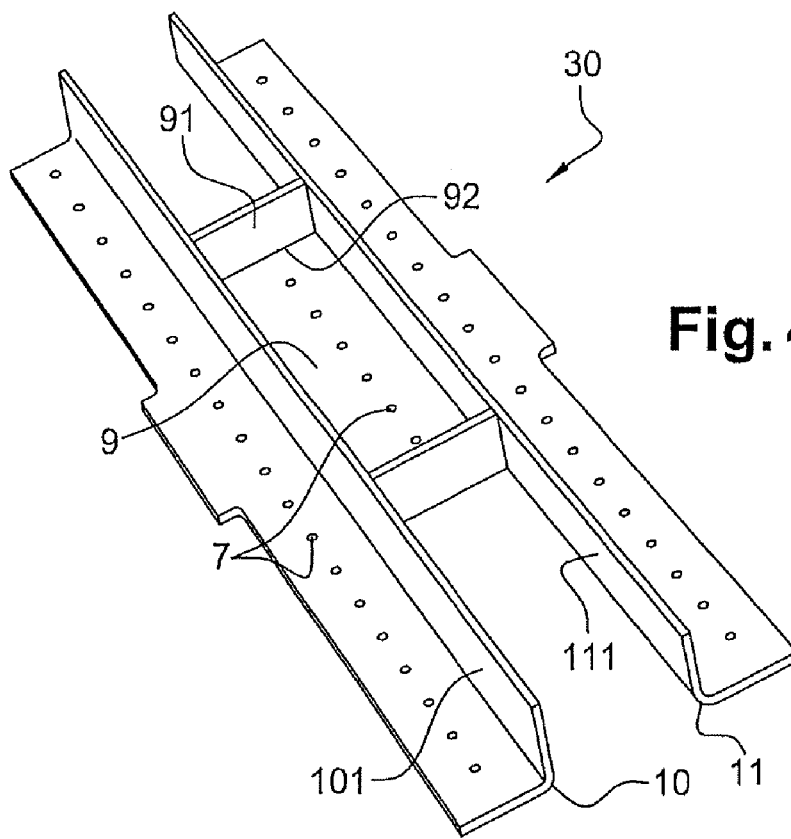
Figure 4D:
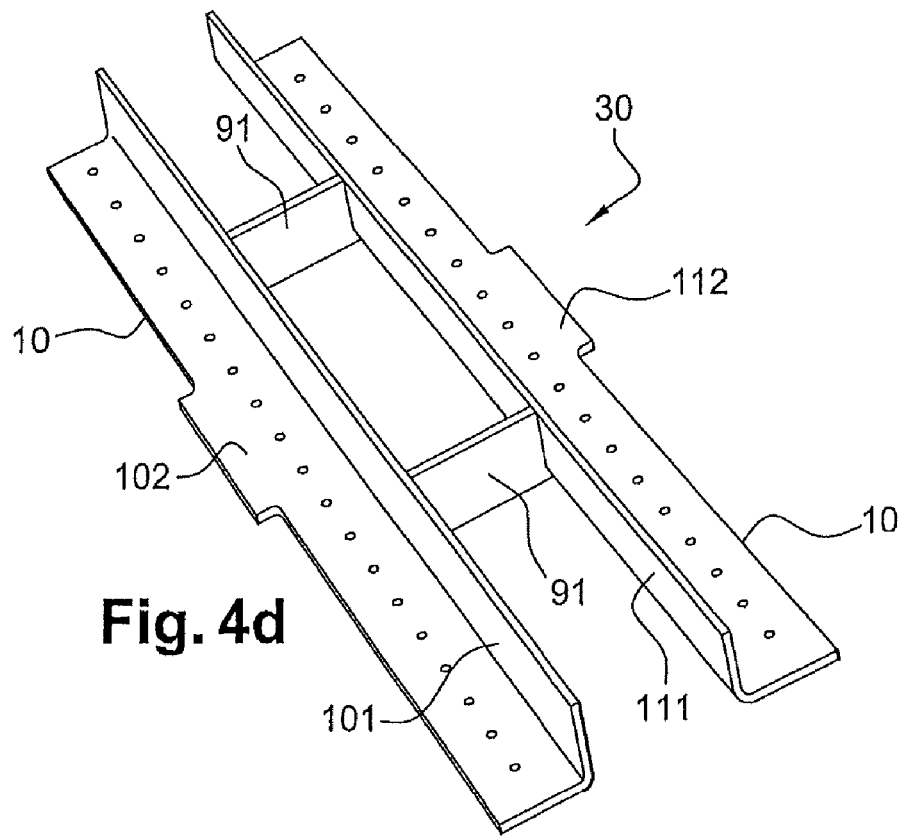

In another form of producing this second embodiment, the central portion 9 also comprises at least one reinforcing rib 91, as illustrated in FIGS. 4b, 4c, 4d, that is substantially perpendicular to the webs 101, 111 of the lateral portions 10, 11 and fastened to said webs of the lateral portions 10, 11. The addition of a rib 91 makes it possible to better distribute the consolidation and prevent the warping of the webs 101, 111 of the two lateral portions 10, 11.

In the example of FIG. 4b, the central portion 9 comprises a central rib 91 that is substantially perpendicular to the webs 101, 111 of the lateral portions 10, 11.

In the example illustrated in FIG. 4c, the central portion 9 comprises two ribs 91, substantially perpendicular to the webs 101, 111 of the lateral portions 10, 11 and said ribs are each positioned at one of the free ends 92 of said central portion.

In the example illustrated in FIG. 4d, the central portion 9 comprises only two ribs 91, substantially perpendicular to the webs 101, 111 of the lateral portions 10, 11. The removal of the central portion 9 saves weight.

Figure 4E:
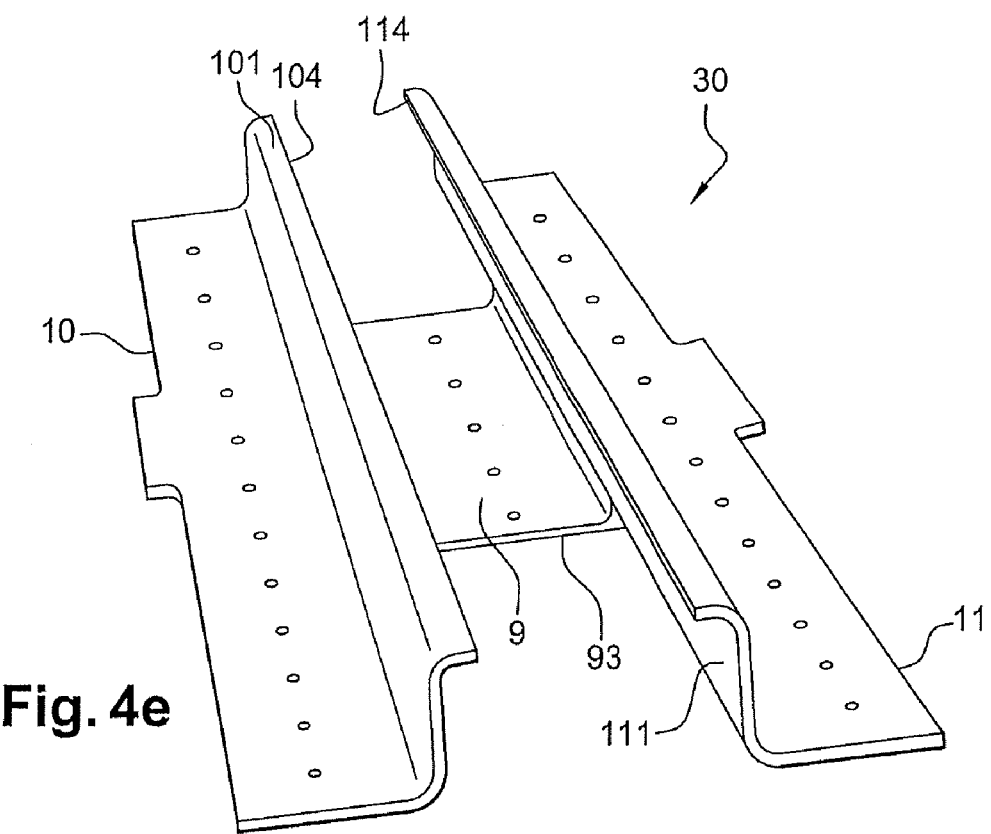

In a variant of this second embodiment, illustrated in FIG. 4e, the lateral portions 10, 11 also comprise, at the end of the webs 101, 111 opposite to the flange 102, 112, a flanged edge 104, 114 in the direction of the webs of the two stiffener elements, so as to enhance the stability of the splice 30.

In this example, the splice comprises the two lateral portions 10, 11 and a central portion 9 comprising a bearing surface 93 in line with the bearing surfaces 103, 113 of the flanges 102, 112 of said two lateral portions.

Figure 5:
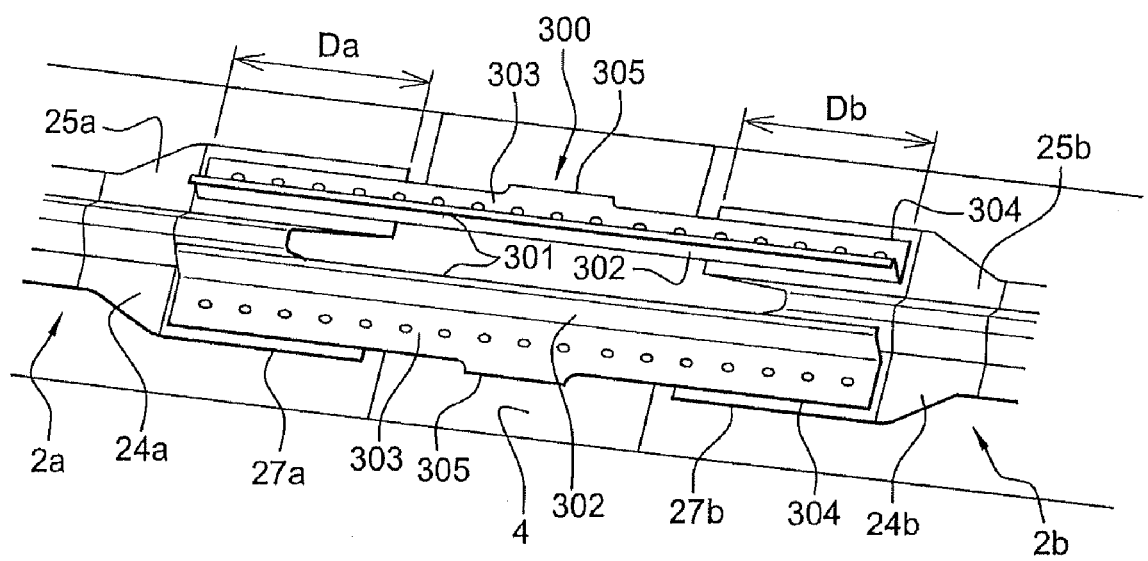

In a third embodiment, illustrated by FIG. 5, the two stiffener elements 2a, 2b are assembled by a splice 300 comprising two independent lateral portions 305, each portion comprising a cross section that is substantially Z-shaped and positioned on either side of the ends of the stiffener elements.

Each lateral portion 305 comprises a head 301, a web 302 and a flange 303, said flanges comprising a bearing surface 304.

The head 301 of each lateral portion 305 is positioned on the side of the webs 22a, 22b, respectively 23a, 23b, of the two elements 2a, 2b.

The bearing surface 304 of a first lateral portion 305, respectively the second lateral portion 305, rests on the flanges 24a, 24b, respectively 25a, 25b, of the ends 27a, 27b of the two stiffener elements 2a, 2b and on the ferrule 4 or the skins 12a, 12b. The bearing surfaces 304 are fastened respectively to the flanges 24a, 24b and 25a, 25b and the ferrule 4 or the skins 12a, 12b by means of fasteners 7.

In a manner similar to the two other embodiments, the lateral portions 305 extend, on either side of the ends of the two stiffener elements, over the length of overlap $D_a$, $D_b$ that is sufficient to allow the working fasteners 7 to be installed and thus ensure the transmission of the tension-compression stresses from the flanges 24a, 24b, 25a, 25b of the elements 2a, 2b to the flanges 303 of the splice 300.

Advantageously, the omega-shaped stiffener and the various splices described are made wholly of composite material. The use of composite materials makes it possible to dispense with the problems of heat and corrosion encountered on metal parts.

The examples of stiffener splicings, at a circumferential joint, are described in the context of a closed-section stiffener comprising an omega-shaped cross section without this choice being a limitation of the disclosed embodiments. The application of the disclosed embodiments can be adapted to all the stiffeners of the fuselage and to any stiffener closed section such as for example a trapezoidal or square cross section.

The disclosed embodiments therefore make it possible to obtain, at a circumferential joint of an aircraft fuselage, a splice between two elements of a stiffener comprising a closed cross section, in particular an omega-shaped composite stiffener, which avoids the necessity to install fasteners in the web and the head of said stiffener while ensuring the continuity of transmission of the longitudinal stresses.

The invention claimed is:

1. An aircraft fuselage comprising a circumferential joint of at least two sections, each section comprising:
   a skin, and
   at least one stiffener element, each stiffener element:
      substantially facing another stiffener element at the joint,
      comprising two stiffener webs,
      comprising two stiffener flanges,
      said two stiffener webs and two stiffener flanges determining, with the skin, a closed cross section,
   in which fuselage the facing stiffener elements are assembled by means of a splice, wherein the facing stiffener elements and the splice are made of composite material, wherein the splice is associated with a single pair of the facing stiffener elements, and the splice:
      comprises two splice webs,
      comprises two separate splice flanges, said separate splice flanges each comprising a bearing surface in contact with a stiffener flange of each facing stiffener element,
      is fastened to the skins and to the pair of facing stiffener elements by means of working fasteners positioned only on the separate splice flanges,
   and wherein each stiffener element comprises a head between the two stiffener webs determining an omega shaped stiffener cross section.

2. The aircraft fuselage according to claim 1, comprising an overlap of the splice flanges and stiffener flanges to allow working fasteners to be placed over a length of the overlap so that all of the tension-compression stresses in the stiffener are transmitted from the flanges of the elements to the flanges of the splice.

3. The aircraft fuselage according to claim 2, wherein the bearing surfaces of the splice flanges are in contact with the stiffener flanges over substantially all of said bearing surfaces over the length of the overlap.

4. The aircraft fuselage according to claim 3, wherein the bearing surfaces are formed to be in contact with the stiffener elements and the skins while taking account of the geometry of said elements and of said skins.

5. The aircraft fuselage according to claim 1, wherein the splice comprises a head, two webs and two flanges defining an omega-shaped cross section, the internal dimensions of said cross section being determined in order to make it possible to fasten the splice to the facing stiffener elements while ensuring that the flanges of the splice are in contact with the flanges of the stiffener elements.

6. The aircraft fuselage according to claim 1, wherein the splice comprises two lateral portions each comprising a web and a flange, said two lateral portions being positioned on each side of the webs of the stiffener elements and connected by a central portion positioned longitudinally on the splice between the ends of said stiffener elements and capable of holding in relative position, one relative to the other, the two lateral portions when the splice is put in place.

7. The aircraft fuselage according to claim 6, wherein the central portion comprises a bearing surface, in line with the bearing surfaces of the flanges of the lateral portions, fastened to the skins by means of working fasteners.

8. The aircraft fuselage according to claim 6, wherein the central portion comprises at least one rib for reinforcing the stability of the splice, said rib being substantially in a cross-sectional plane of the splice and being fastened to the webs of the lateral portions.

9. The aircraft fuselage according to claim 6, wherein the lateral portions comprise a flanged edge, at the end of the webs opposite to the flanges of the splice.

10. The aircraft fuselage according to claim 1, wherein the splice comprises two independent lateral portions, a first portion arranged on one side of the webs of the stiffener elements, a second portion on the other side of the webs.

* * * * *